H. B. SIEGMUND.
CAN COVER REMOVER.
APPLICATION FILED SEPT. 30, 1919.
1,333,136.
Patented Mar. 9, 1920.
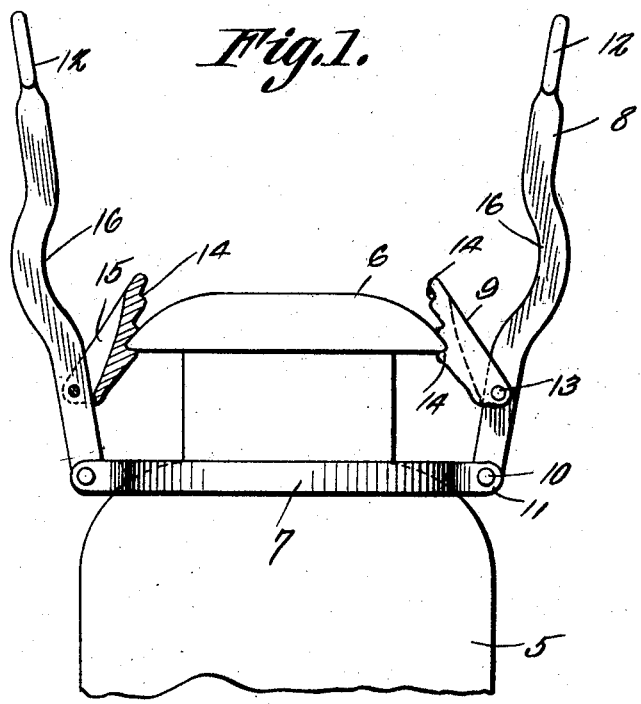
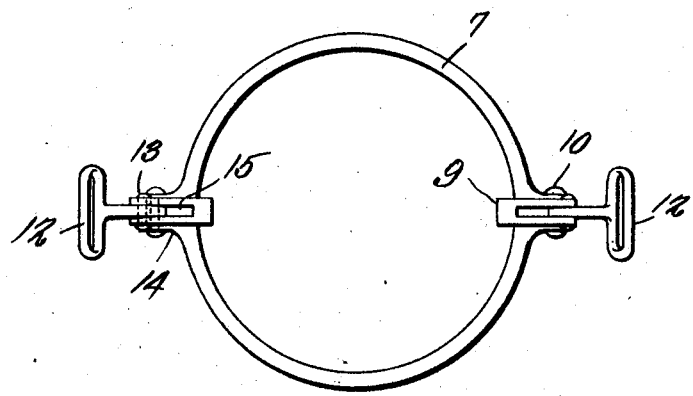
INVENTOR.
Harry B. Siegmund
ATTORNEY.

UNITED STATES PATENT OFFICE.

HARRY B. SIEGMUND, OF BALTIMORE, MARYLAND.

CAN-COVER REMOVER.

1,333,136.  Specification of Letters Patent.  Patented Mar. 9, 1920.

Application filed September 30, 1919. Serial No. 327,464.

*To all whom it may concern:*

Be it known that I, HARRY B. SIEGMUND, a citizen of the United States, residing at Baltimore, State of Maryland, have invented certain new and useful Improvements in Can-Cover Removers, of which the following is a specification.

The device which is the subject matter of the present application for patent has been devised for the purpose of facilitating the removal of the lids or covers of milk cans or other receptacles having a tight-fitting closure which is usually difficult to remove, and the object of the invention is to provide a very simple and efficient device of this kind which can be easily and quickly applied to the can and taken off after removal of the lid, and also to provide a device of the kind stated which is very powerful in action so that the removal of a tight-fitting lid is readily effected.

The object stated is attained by means of a novel combination and arrangement of parts to be hereinafter described and claimed, and in order that the same may be better understood, reference is had to the accompanying drawing forming a part of this specification.

In the drawing,

Figure 1 is an elevation of the device showing its application, and

Fig. 2 is a plan view of the device.

Referring specifically to the drawing, 5 denotes a fragment of a milk can or other container, provided with a tight-fitting lid 6. The device for effecting removal of the lid comprises a supporting member and a toggle mechanism for exerting an upward thrust or pressure against the lid.

The supporting member is a plain ring 7 of a diameter to slip over the lid so that it may be seated on the top of the can.

The toggle mechanism comprises a lever carrying a pawl-like thrust member 9, and pivoted at one end, as shown at 10, to outstanding ears 11 on the ring, the other end of the lever having a hand grip 12. The member 9 is pivoted to the lever intermediate the ends of the latter as shown at 13, close to the pivot or fulcrum 10, in order that a powerful leverage may be obtained.

The member 9 is designed to engage the edge of the lid 6, and its forward portion is stepped to produce a plurality of shoulders 14 either one of which is engageable with the edge of the lid to prevent slipping. The back of the member 9 is recessed as shown at 15 so that it can swing back close to the lever 8, the latter entering the recess when said member is thus swung toward the lever, and for the same purpose the lever has a rearward bend 16 producing a recess to accommodate the member 9.

Two levers 8 and thrust members 9 are provided, they being positioned diametrically opposite each other.

The device is applied to the can 5 by seating the ring 7 on the top thereof as shown in Fig. 1. The levers 8 are then swung upwardly, and the thrust members 9 are set to engage under the edge of the cap 6. With the parts in this position, the points 13 are off to one side of straight lines connecting the points 10 and the points of engagement of the thrust members with the lid. If now the levers 8 are forced inwardly or toward each other, the pawl members will be forced upwardly to exert a powerful thrust against the lid in the direction to force the same off the can neck, the action being similar to that of a toggle. The mechanism is very powerful, and a slight force applied to the levers suffices to readily remove the lid.

I claim:

1. A device of the character described, comprising a support, a pair of diametrically opposite levers fulcrumed on the support, and pawl-like thrust members pivoted to the levers at points to produce toggle joints.

2. A device of the character described, comprising a support, a pair of diametrically opposite levers fulcrumed on the support, and pawl-like thrust members pivoted to the levers at points to produce toggle joints, the free ends of the thrust members being stepped to produce a plurality of work engaging shoulders.

3. A device of the character described, comprising a support, a pair of diametrically opposite levers fulcrumed on the support, and pawl-like thrust members pivoted to the levers at points to produce toggle joints, the back of the thrust members being recessed to swing close to the levers.

In testimony whereof I affix my signature in presence of two witnesses.

HARRY B. SIEGMUND.

Witnesses:
E. WALTON BREWINGTON,
HOWARD D. ADAMS.